United States Patent [19]

Urushibata et al.

US005281358A

[11] Patent Number: 5,281,358
[45] Date of Patent: Jan. 25, 1994

[54] DEINKING AGENT

[75] Inventors: Hideaki Urushibata; Koji Hamaguchi; Hiroyoshi Hiramatsu; Yoshitaka Miyauchi, all of Wakayama, Japan

[73] Assignee: Kao Corporation, Tokyo, Japan

[21] Appl. No.: 752,620

[22] PCT Filed: Oct. 24, 1990

[86] PCT No.: PCT/JP90/01367
   § 371 Date: Aug. 20, 1991
   § 102(e) Date: Aug. 20, 1991

[87] PCT Pub. No.: WO92/07996
   PCT Pub. Date: May 14, 1992

[51] Int. Cl.$^5$ ............................................. D21C 5/02
[52] U.S. Cl. ............................ 252/174.21; 252/60; 252/61; 252/DIG. 1; 162/5
[58] Field of Search ............... 252/60, 61, 174.21, 252/DIG. 1; 162/5

[56] References Cited

U.S. PATENT DOCUMENTS

| | | | |
|---|---|---|---|
| 4,964,949 | 10/1990 | Hamaguchi et al. | 162/5 |
| 5,100,574 | 3/1992 | Urushibata et al. | 252/174.22 |
| 5,120,397 | 6/1992 | Urushibata | 162/5 |
| 5,158,697 | 10/1992 | Kawamuri et al. | 252/60 |

FOREIGN PATENT DOCUMENTS

| | | |
|---|---|---|
| 46-10409 | 3/1971 | Japan . |
| 49-10433 | 3/1974 | Japan . |
| 7410433 | 3/1974 | Japan . |
| 0239585 | 11/1985 | Japan . |
| 63-227880 | 9/1988 | Japan . |
| 1-12876 | 3/1989 | Japan . |
| 1-57194 | 4/1989 | Japan . |
| 1-111086 | 4/1989 | Japan . |
| 1-59393 | 12/1989 | Japan . |

*Primary Examiner*—Paul Lieberman
*Assistant Examiner*—Michael P. Tierney
*Attorney, Agent, or Firm*—Birch, Stewart, Kolasch & Birch

[57] ABSTRACT

A deinking agent comprising an ester mixture as the active ingredient, wherein the ester mixture is obtained by adding ethylene oxide and propylene oxide to a mixture obtained by reacting a natural fat or a reaction product, obtained by preliminarily reacting a natural fat with glycerol, with a monohydric or dihydric alcohol in such a manner as to give a molar ratio of the alcohol to the glycerol in the natural fat of from 0.02/1 to 1/1. By using the deinking agent of the present invention, a less sticky deinked pulp can be obtained without any foaming troubles or dulling.

3 Claims, No Drawings

DEINKING AGENT

BACKGROUND OF THE INVENTION

The present invention relates to a deinking agent to be used for the reclamation of waste papers such as newspapers and magazines. More particularly, the present invention relates to a deinking agent that yields a deinked pulp having a high b value and showing good defoaming properties of a flotation reject can be obtained by deinking, for example, newspapers or magazines according to a combination of the flotation and washing methods.

It has long been a practice to reclaim waste papers such as newspapers and magazines. Recently the effective utilization of waste papers has become important in conjunction with the problems of the shortage of pulp resources and an increase in the cost thereof. Further, it has been attempted to use deinked pulp in the production of higher quality products. On the other hand, recent improvements in printing techniques, printing systems and printing ink compositions, as well as the utilization of waste papers that have never been reclaimed before, have made it difficult to deink waste papers. In order to facilitate deinking, therefore, attempts have been made to improve deinking devices. In order to remove inks and other impurities from waste paper, there have been used alkaline agents such as caustic soda, sodium silicate, sodium carbonate and sodium phosphate, bleaching agents such as hydrogen peroxide, hydrosulfites and hypochlorites, and sequestering agents such as EDTA and DTPA together with deinking agents including anionic surfactants such as alkylbenzenesulfonates, higher alcohol sulfates, α-olefinsulfonates and dialkyl sulfosuccinates, ethylene oxide adducts of higher alcohols, alkylphenols and fatty acids, and nonionic surfactants such as alkanolamides, either alone or in the form of a mixture thereof. Although these deinking agents show excellent foaming properties in the flotation treatment, their ability to collect ink is limited. In the washing method, on the other hand, these drinking agents are poor in detergency and the good foaming properties thereof cause trouble in draining. As a result, only a deinked pulp of a low grade can be obtained. Furthermore, even when a pulp of a high whiteness is obtained, a dull color remains to restrict the utilization of the deinked pulp (for example, employed in a decreased amount under the surface of cardboard or added in a decreased amount to newspapers), or so as to do the amount of a bleaching agent must be increased to eliminate away with the dullness. In order to obtain a deinked pulp which is free from dullness and has a light color tone, it is necessary to elevate the b value. Although the b value can be elevated by using a large amount of alkali, other problems such as increases in sticky matters, the draining load and the brittleness of the obtained pulp may occur in this case. Thus no effective means has been known for solving these problems.

The present inventors proposed the use of a reaction product obtained by adding an alkylene oxide to a mixture of a natural fat and a trihydric or higher alcohol as a deinking agent (cf. Japanese Patent Laid-Open No. 239585/1985).

As the result of investigations on the behaviors of such a reaction product in a deinking process, however, disadvantages were recognized. That is, a compound obtained by using a natural fat and a trihydric or higher alcohol at a molar ratio of from 1:0.5 to 1:3 frequently cause foaming problems in the flotation, dehydration, draining and papermaking stages. Further, the deinked pulp thus obtained was not completely free from a dull color, though it had a high whiteness.

SUMMARY OF THE INVENTION

The present inventors have conducted extensive studies in order to develop a deinking agent which shows good deinking performance (a high b value) when used in deinking according to a combination of the flotation and washing methods, and has good defoaming properties of a reject in the flotation stage, thus avoiding foaming problems. As a result, the present inventors have surprisingly found out that a deinking agent comprising a specific nonionic surfactant as an essential component satisfies the above requirements, thus completing the present invention.

Accordingly, the present invention provides a deinking agent comprising an ester mixture as the active ingredient, wherein the ester mixture is obtained by adding ethylene oxide and propylene oxide at a molar ethylene oxide/propylene oxide ratio of from 0.5 to 4 (preferably from 1.8 to 2.2) to an ester mixture which is obtained by reacting a natural fat or a reaction product, preliminarily obtained by reacting a natural fat with glycerol, with a monohydric or dihydric alcohol at a molar ratio of the alcohol to the glycerol moiety in the natural fat of from 0.02/1 to 1/1 (preferably from 0.05/1 to 0.48/1), to obtain an ester mixture having hydroxyl value of from 3 to 50, preferably from 3 to 28 (in the case of a monohydric alcohol), or from 10 to 150, preferably from 10 to 78 (in the case of a dihydric alcohol) in such a manner as to give an addition mol number of the ethylene oxide of from 5 to 200, preferably from 10 to 100 (in the case of a monohydric alcohol) or from 10 to 400, preferably from 20 to 200 (in the case of a dihydric alcohol).

As the monohydric alcohol to be used in the present invention, 1-alkanols and 2-alkanols, unsaturated alcohols and cyclic alcohols having 1 to 24 carbon atoms may be used. Examples thereof include aliphatic alcohols such as octanol, nonanol, decanol, undecanol, lauryl alcohol, myristyl alcohol, cetyl alcohol, stearyl alcohol, eicosanol, oleyl alcohol, elaidyl alcohol and linoleyl alcohol and synthetic alcohols such as methyl alcohol, ethyl alcohol, propyl alcohol, isopropyl alcohol, 2-ethylhexanol, hexan-2-ol, 2-hexenol, cyclononanol and cyclodecanol.

As the dihydric alcohol to be used in the present invention, α,ω-glycols, 1,2-diols, symmetric α-glycols and cyclic 1,2-diols having 2 to 23 carbon atoms may be used. Examples thereof include hexadecane-1,2-diol, octadecane-1,2-diol, eicosane-1,2-diol, ethylene glycol, propylene glycol, butanediol, hexanediol, cyclononane-1,2-diol, butanoyi-α-glycol and hexanoyl-α-glycol.

As the fat to be used in the present invention, vegetable oils such as coconut oil, palm oil, olive oil, soybean oil, rapeseed oil, linseed oil, castor oil and sunflower oil, terrestrial animal fats such as lard, beef tallow and bone oil, aquatic animal oils such as sardine oil and herring oil, hardened or semi-hardened oils obtained therefrom and recovered oils collected during the refining procedure thereof may be cited. Further, monoesters or diesters obtained by preliminarily reacting these natural fats with glycerol may be used therefor.

It is important in the present invention that the molar ratio of the monohydric or dihydric alcohol to the glycerol moiety in the natural fat range from 0.02/1 to 1/1. It is also important that the hydroxyl value (OHV) of the ester mixture range from 3 to 50 (in the case of a monohydric alcohol) or from 10 to 150 (in the case of a dihydric alcohol).

In the calculation of the molar ratio of the monohydric or dihydric alcohol to the glycerol, the term "glycerol moiety in the natural fat" means the amount of glycerol moiety that combines with fatty acid to constitute the natural fat, and the amount of glycerol moiety that is used to react with the fat in order to modify the fat.

A compound having the molar ratio and hydroxyl value within these ranges is effective in removing fine ink spots and thus can give a deinked pulp having a light color and a high b value. When these values are outside these ranges, the dull color of the obtained deinked pulp remains unremoved.

In the present invention, ethylene oxide and propylene oxide may be added either at random (random addition) or successively (block addition). The former is preferable from the viewpoint of reducing foaming problems.

It is required that the molar ethylene oxide/propylene oxide ratio range from 0.5 to 4.0 and that the addition molar number of ethylene oxide range from 5 to 200 (in the case of a monohydric alcohol) or from 10 to 400 (in the case of a dihydric alcohol). When these values do not fall within the ranges specified above, the ability to liberate ink from waste papers is deteriorated. Furthermore, in the case of the flotation treatment, the defoaming properties of a reject in the flotation pit are deteriorated. It is therefore essential to use a compound satisfying the aforesaid requirements in order to give a deinking agent which gives a deinked pulp having a high b value and showing good defoaming properties of a flotation reject.

In the present invention, the method of adding ethylene oxide and propylene oxide is not particularly restricted. Thus it may be performed under conditions commonly employed for adding alkylene oxides to a compound having active hydrogen. Namely, a catalytic amount of an alkaline material is added to the mixture of a natural fat (triglyceride) or the reaction product, obtained by reacting a natural fat with glycerol, with a monohydric or dihydric alcohol optionally together with a glycerol ester originating in said fat. Next, the resulting mixture is reacted with ethylene oxide and propylene oxide at approximately 100° to 200° C. under 1 to 3 kg/cm$^2$ (gauge) for several hours.

When used together with known deinking agents such as higher alcohol sulfates, alkylbenzene-sulfonates, higher alcohols or alkylphenol/ethylene oxide adducts, the deinking agent of the present invention exerts an excellent performance. The deinking agent of the present invention may be added at any one of the waste paper breaking, high-concentration bleaching and preflotation stages. Alternately, it may be added in portions at each of these stages. It may be added preferably in an amount of from 0.03 to 1.0% by weight based on the starting waste papers.

To further illustrate the present invention, and not by way of limitation, the following Production Examples and Examples will be given.

PRODUCTION EXAMPLE 1

154.2 g of beef tallow, 9.7 g of stearyl alcohol and 1.5 g of 100% KOH were fed into a 1.5-l autoclave and heated to 130° C. under stirring at approximately 600 rpm.

Next, the above mixture was reacted with 833.9 g of an ethylene oxide/propylene oxide mixture (molar ratio: 2-2/1) at 130° to 140° C. under 1 to 3 kg/cm$^2$ (gauge).

After the completion of the reaction, the mixture was cooled to 80° C. and the pH value thereof was adjusted to approximately 6 with acetic acid. The yield of the reaction product (invention product No. 1 given in Table 1) was 98%.

PRODUCTION EXAMPLE 2

200.7 g of beef tallow, 4.6 g of 2-ethylhexanol and 2.0 g of 100% KOH were fed into a 1.5-l autoclave and heated to 150° C. under stirring at approximately 600 rpm.

Next, the above mixture was reacted with 494.2 g of ethylene oxide in portions at 150° to 160° C. under 1 to 3 kg/cm$^2$ (gauge).

After the completion of the addition of ethylene oxide, the mixture was cooled to 120° to 130° C. and then reacted with 298.6 g of propylene oxide under 1 to 3 kg/cm$^2$ (gauge).

Then the mixture was cooled to 80° C. and the pH value thereof was adjusted to approximately 6 with acetic acid. The yield of the reaction product (invention product No. 11 given in Table 2) was 99%.

PRODUCTION EXAMPLE 3

138.0 g of beef tallow, 2.0 g of ethylene glycol and 1.3 g of 100% KOH were fed into a 1.5-l autoclave and heated to 130° C. under stirring at approximately 600 rpm.

Next, the above mixture was reacted with 858.4 g of an ethylene oxide/propylene oxide mixture (molar ratio: 1.8/1) at 135° to 140° C. under 1 to 3 kg/cm$^2$ (gauge).

After the completion cf the reaction, the mixture was cooled to 80° C. and the pH value thereof was adjusted to approximately 6 with acetic acid. The yield of the reaction product (invention product No. 31 given in Table 5) was 98%.

PRODUCTION EXAMPLE 4

100.0 g of beef tallow, 2.4 g of ethylene glycol and 1.3 g of 100% KOH were fed into a 1.5-l autoclave and heated to 150° C. under stirring at approximately 600 rpm.

Next, the above mixture was reacted with 540.2 g of ethylene oxide in portions at 155° to 165° C. under 1 to 3 kg/cm$^2$ (gauge).

After the completion of the addition of ethylene oxide, the mixture was cooled to 120° to 130° C. and then reacted with 356.1 g of propylene oxide under 1 to 3 kg/cm$^2$ (gauge).

Then the mixture was cooled to 80° C. and the pH value thereof was adjusted to approximately 6 with acetic acid. The yield of the reaction product (invention product No. 41 given in Table 6) was 99%.

EXAMPLE 1

A recovered waste newspaper/magazine mixture (50/50 by weight) was cut into pieces (2×5 cm) and a given amount thereof was fed into a bench disintegrator. Then water, 0.8% (based on the starting waste papers) of caustic soda, 2.5% (based on the starting waste papers) of sodium silicate No. 3, 2.8% (based on the starting waste papers) of 30% hydrogen peroxide and 0.2% (based on the starting waste papers) of each of the deinking agents listed in Table 1 were added thereto. After disintegrating at a pulp concentration of 5% at 45° C. for 20 minutes, the mixture was aged at 45° C. for 60 minutes. Next, it was diluted with water to a pulp concentration of 1.0% and subjected to flotation at 30° C. for 10 minutes. After the completion of the flotation, the obtained pulp slurry was concentrated until the pulp concentration reached 6% and then diluted with water so as to give a concentration of 1%. Then it was treated with a TAPPI sheet machine to thereby give a pulp sheet.

The b value of the obtained pulp sheet was measured with a color difference meter. The percentage defoaming of the flotation reject was determined in accordance with the following equation:

percentage defoaming of flotation reject (%) =

$$\left(1 - \frac{\text{reject volume after 30 seconds}}{\text{reject volume}}\right) \times 100$$

A larger value means better defoaming properties while a smaller value means worse defoaming properties.

The term "b value" as used herein means the value of b of the Lab color space in accordance with Hunter's color difference formula. The relation thereof with the tristimulus values (X, Y and Z) is as follows:

$$b = 7.0\, (Y - 0.847\, Z)/\sqrt{Y}$$

As the above equation shows, the value is a function of Y and Z. A positive b value means the intenseness of yellowness, while a negative one means that of blueness.

Table 1 shows the molar monohydric alcohol/glycerol ratio and deinking performance of each deinking agent.

TABLE 1

Molar monohydric alcohol/glycerol ratio and deinking performance

| No. | Monohydric alcohol | Natural fat | Monohydric alcohol/glycerol (by mole) | OHV | Alkylene oxide compound*[1] | EO/PO (by mole) | EO mol no. | Qualities of deinking pulp b value (%) | percentage defoaming of flotation reject (%) |
|---|---|---|---|---|---|---|---|---|---|
| Invention product | | | | | | | | | |
| 1 | stearyl alcohol | beef tallow | 0.20/1 | 12.3 | EO/PO (block) | 2.2 | 66 | 9.72 | 92 |
| 2 | lauryl alcohol | fish oil | 0.8/1 | 9.5 | EO/PO (random) | 2.0 | 40 | 9.76 | 90 |
| 3 | oleyl alcohol | coconut oil | 0.05/1 | 16.3 | EO/PO (block) | 1.8 | 36 | 9.86 | 88 |
| Comparative product | | | | | | | | | |
| 4 | stearyl alcohol | beef tallow | 3.8/1 | 51.3 | EO/PO (random) | 2.2 | 66 | 9.33 | 52 |
| 5 | stearyl alcohol | beef tallow | 0.01/1 | 2.7 | EO/PO (random) | 2.2 | 66 | 9.40 | 46 |
| 6 | stearyl alcohol | beef tallow monoglyceride | 1.5/1 | 235.1 | EO/PO (random) | 2.2 | 66 | 9.11 | 51 |
| 7 | polyoxyethylene (10 mol) polyoxypropylene (7 mol) lauryl ether | | | | | | | 7.60 | 35 |
| 8 | polyoxyethylene (12 mol) nonylphenyl ether | | | | | | | 7.55 | 20 |
| 9 | sodium dodecylbenzenesulfonate | | | | | | | 7.39 | 9 |
| 10 | ammonium oleate | | | | | | | 8.56 | 16 |

*[1]EO: ethylene oxide. PO: propylene oxide.

EXAMPLE 2

Recovered waste magazines were cut into pieces (2×5 cm) and a given amount thereof was fed into a high-concentration pulper. Then water, 0.5% (based on the starting waste papers) of caustic soda, 1.5% (based on the starting waste papers) of sodium silicate No. 3, 1.0% (based on the starting waste papers) of 30% hydrogen peroxide and 0.05% (based on the starting waste papers) of each of the deinking agents listed in Table 2 were added thereto to conduct disintegration at a pulp concentration of 15% at 45° C. for 20 minutes. Next, it was diluted with water to a pulp concentration of 4.0% and then further diluted with water to a pulp concentration of 1.0%. Then it was subjected to flotation at 30° C. for 10 minutes. After the completion of the flotation, the obtained pulp slurry was concentrated until the pulp concentration reached 6% and then diluted with water so as to give a concentration of 1%. Then it was treated with a TAPPI sheet machine to thereby give a pulp sheet.

The b value of the obtained pulp sheet was measured with a color difference meter and the percentage defoaming of the flotation reject was determined.

Table 2 shows the molar ethylene oxide/propylene oxide ratio and deinking performance of each deinking agent.

TABLE 2

Molar ethylene oxide/propylene oxide ratio and deinking performance

| No. | Monohydric alcohol | Natural fat | Monohydric alcohol/ glycerol (by mole) | OHV | Alkylene oxide compound*1 | EO/PO (by mole) | EO mol no. | Qualities of deinking pulp b value (%) | percentage defoaming of flotation reject (%) |
|---|---|---|---|---|---|---|---|---|---|
| Invention product | | | | | | | | | |
| 11 | 2-ethylhexanol | beef tallow | 0.15/1 | 9.6 | EO/PO (block) | 3.2 | 48 | 7.76 | 86 |
| 12 | lauryl alcohol | palm oil | 0.25/1 | 16.0 | EO/PO (random) | 1.5 | 62 | 7.52 | 82 |
| 13 | 2-ethylhexanol | beef tallow | 0.15/1 | 9.6 | EO/PO (block) | 4.2 | 48 | 7.06 | 52 |
| 14 | 2-ethylhexanol | beef tallow | 0.15/1 | 9.6 | EO/PO (block) | 0.4 | 48 | 7.04 | 63 |
| 15 | lauryl alcohol | palm oil | 0.25/1 | 16.0 | EO/PO (random) | 4.5 | 62 | 6.93 | 66 |
| 16 | lauryl alcohol | palm oil | 0.25/1 | 16.0 | EO/PO (random) | 0.3 | 62 | 6.95 | 55 |

*1EO: ethylene oxide. PO: propylene oxide.

EXAMPLE 3

Recovered waste magazines were cut into pieces (2×5 cm) and a given amount thereof was fed into a low concentration pulper. Then water, 0.5% (based on the starting waste papers) of caustic soda, 1.0% (based on the starting waste papers) of sodium silicate No. 3, 0.8% (based on the starting waste papers) of 30% hydrogen peroxide, 0.05% (based on the starting waste papers) of a chelating agent (DTPA) and 0.06% (based on the starting waste papers) of each of the deinking agents listed in Table 3 were added thereto to conduct disintegration at a pulp concentration of 4% at 40° C. for 15 minutes. Next, it was diluted with water to a pulp concentration of 1.0% and subjected to flotation at 30° C. for 10 minutes. After the completion of the flotation, the obtained pulp slurry was concentrated until the pulp concentration reached 6% and then diluted with water so as to give a concentration of 1%. Then it was treated with a TAPPI sheet machine to thereby give a pulp sheet.

The b value of the obtained pulp sheet was measured with a color difference meter and the percentage defoaming of the flotation reject was determined.

Table 3 shows the ethylene oxide addition mol number and deinking performance of each deinking agent.

EXAMPLE 4

A recovered waste newspare/magazine mixture (50/50 by weight) was cut into pieces (2×5 cm) and a given amount thereof was fed into a bench disintegrator. Then water, 0.8% (based on the starting waste papers) of caustic soda, 2.0% (based on the starting waste papers) of sodium silicate No. 3, 1.5% (based on the starting waste papers) of 30% hydrogen peroxide and 0.5% (based on the starting waste papers) of each of the deinking agents listed in Table 4 were added thereto to conduct disintegration at a pulp concentration of 5% at 50° C. for 15 minutes and then aging at 50° C. for 2 hours. Next, it was diluted with water to a pulp concentration of 1.0% and subjected to flotation at 30° C. for 10 minutes. After the completion of the flotation, the obtained pulp slurry was concentrated until the pulp concentration reached 6% and then diluted with water so as to give a concentration of 1%. Then it was treated with a TAPPI sheet machine to thereby give a pulp sheet.

The b value of the obtained pulp sheet was measured with a color difference meter and the percentage defoaming of the flotation reject was determined.

Table 4 shows the order of the addition od the alkylene oxides to the glycerol ester and deinking performance of each deinking agent.

TABLE 3

Ethylene oxide addition mol number and deinking performance

| No. | Monohydric alcohol | Natural fat | Monohydric alcohol/ glycerol (by mole) | OHV | Alkylene oxide compound*1 | EO/PO (by mole) | EO mol no. | Qualities of deinking pulp b value (%) | percentage defoaming of flotation reject (%) |
|---|---|---|---|---|---|---|---|---|---|
| Invention product | | | | | | | | | |
| 17 | 2-ethylhexanol | beef tallow | 0.4/1 | 24.6 | EO/PO (random) | 1.9 | 20 | 7.46 | 86 |
| 18 | oleyl alcohol | bone oil | 0.45/1 | 26.7 | EO/PO (block) | 2.1 | 150 | 7.62 | 92 |
| 19 | 2-ethylhexanol | beef tallow | 0.4/1 | 24.6 | EO/PO (random) | 1.9 | 4 | 6.78 | 52 |
| 20 | 2-ethylhexanol | beef tallow | 0.4/1 | 24.6 | EO/PO (random) | 1.9 | 210 | 6.72 | 43 |
| 21 | oleyl alcohol | bone oil | 0.45/1 | 26.7 | EO/PO (block) | 2.1 | 3 | 6.93 | 22 |
| 22 | oleyl alcohol | bone oil | 0.45/1 | 26.7 | EO/PO (block) | 2.1 | 220 | 6.96 | 18 |

*1EO: ethylene oxide. PO: propylene oxide.

TABLE 4

Order of the addition of alkylene oxides and deinking performance

| No. | Monohydric alcohol | Natural fat | Monohydric alcohol/ glycerol (by mole) | OHV | Alkylene oxide compound*1 | EO/PO (by mole) | EO mol no. | Qualities of deinking pulp b value (%) | percentage defoaming of flotation reject (%) |
|---|---|---|---|---|---|---|---|---|---|
| Invention product | | | | | | | | | |
| 23 | lauryl alcohol | palm oil | 0.15/1 | 9.8 | EO/PO (random) | 1.8 | 82 | 9.81 | 91 |
| 24 | isopropyl alcohol | beef tallow | 0.25/1 | 15.8 | EO/PO (random) | 2.1 | 42 | 9.82 | 88 |
| 25 | lauryl alcohol | palm oil | 0.15/1 | 9.8 | EO/PO (block) | 1.8 | 82 | 9.60 | 90 |
| 26 | isopropyl alcohol | beef tallow | 0.25/1 | 15.8 | EO/PO (block) | 2.1 | 42 | 9.70 | 91 |

*1 EO: ethylene oxide. PO: propylene oxide.

EXAMPLE 5

A recovered waste newspaper/magazine mixture (50/50 by weight) was cut into pieces (2×5 cm) and a given amount thereof was fed into a bench disintegrator. Then water, 0.8% (based on the starting waste papers) of caustic soda, 2.5% (based on the starting waste papers) of sodium silicate No. 3, 2.8% (based on the starting waste papers) of 30% hydrogen peroxide and 0.2% (based on the starting waste papers) of each of the deinking agents listed in Table 5 were added thereto to conduct disintegration at a pulp concentration of 5% at 45° C. for 20 minutes and then aging at 45° C. for 60 minutes. Next, it was diluted with water to a pulp concentration of 1.0% and subjected to flotation at 30° C. for 10 minutes. After the completion of the flotation, the obtained pulp slurry was concentrated until the pulp concentration reached 6% and then diluted with water so as to give a concentration of 1%. Then it was treated with a TAPPI sheet machine to thereby give a pulp sheet.

The b value of the obtained pulp sheet was measured with a color difference meter and the percentage defoaming of the flotation reject was determined.

Table 5 shows the molar dihydric alcohol/glycerol ratio and deinking performance of each deinking agent.

EXAMPLE 6

Recovered waste magazines were cut into pieces (2×5 cm) and a given amount thereof was fed into a high-concentration pulper. Then water, 0.5% (based on the starting waste papers) of caustic soda, 1.5% (based on the starting waste papers) of sodium silicate No. 3, 1.0% (based on the starting waste papers) of 30% hydrogen peroxide and 0.05% (based on the starting waste papers) of each of the deinking agents listed in Table 6 were added thereto to conduct disintegration at a pulp concentration of 15% at 45° C. for 20 minutes. Next, it was diluted with water to a pulp concentration of 4.0% and then further diluted with water to a pulp concentration of 1.0%. Then it was subjected to flotation at 30° C. for 10 minutes. After the completion of the flotation, the obtained pulp slurry was concentrated until the pulp concentration reached 6% and then diluted with water so as to give a concentration of 1%. Then it was treated with a TAPPI sheet machine to thereby give a pulp sheet.

The b value of the obtained pulp sheet was measured with a color difference meter and the percentage defoaming of the flotation reject was determined.

Table 6 shows the molar ethylene oxide/propylene oxide ratio and deinking performance of each deinking agent.

TABLE 5

Molar dihydric alcohol/glycerol ratio and deinking performance

| No. | Dihydric alcohol | Natural fat | Dihydric alcohol/ glycerol (by mole) | OHV | Alkylene oxide compound*1 | EO/PO (by mole) | EO mol no. | Qualities of deinking pulp b value (%) | percentage defoaming of flotation reject (%) |
|---|---|---|---|---|---|---|---|---|---|
| Invention product | | | | | | | | | |
| 27 | ethylene glycol | beef tallow | 0.20/1 | 25.8 | EO/PO (random) | 2.2 | 60 | 9.63 | 92 |
| 28 | propylene glycol | fish oil | 0.7/1 | 18.5 | EO/PO (random) | 2.0 | 42 | 9.62 | 93 |
| 29 | butanediol | coconut oil | 0.05/1 | 65.6 | EO/PO (block) | 1.8 | 128 | 9.51 | 88 |
| Comparative product | | | | | | | | | |
| 30 | ethylene glycol | beef tallow | 5.4/1 | 60.0 | EO/PO (random) | 2.2 | 60 | 9.20 | 42 |
| 31 | ethylene glycol | beef tallow | 0.01/1 | 5.0 | EO/PO (random) | 2.2 | 60 | 9.23 | 52 |
| 32 | ethylene glycol | coconut oil monoglyceride | 1.2/1 | 343.2 | EO/PO (random) | 2.2 | 60 | 9.08 | 51 |
| 33 | polyoxyethylene (12 mol) polyoxypropylene (2 mol) lauryl ether | | | | | | | 7.40 | 24 |
| 34 | polyoxyethylene (10 mol) polyoxypropylene (8 mol) octyl ether | | | | | | | 7.42 | 21 |
| 35 | sodium dodecylbenzenesulfonate | | | | | | | 7.18 | 10 |
| 36 | sodium laurate | | | | | | | 8.24 | 15 |

*1 EO: ethylene oxide. PO: propylene oxide.

TABLE 6

Molar ethylene oxide/propylene oxide ratio and deinking performance

| No. | Dihydric alcohol | Natural fat | Dihydric alcohol/ glycerol (by mole) | OHV | Alkylene oxide compound*1 | EO/PO (by mole) | EO mol no. | Qualities of deinking pulp b value (%) | percentage defoaming of flotation reject (%) |
|---|---|---|---|---|---|---|---|---|---|
| Invention product | | | | | | | | | |
| 37 | ethylene glycol | coconut oil | 0.25/1 | 42.0 | EO/PO (block) | 1.5 | 122 | 7.70 | 83 |
| 38 | propylene glycol | palm oil | 0.25/1 | 33.1 | EO/PO (random) | 1.8 | 80 | 7.43 | 86 |
| 39 | ethylene glycol | palm oil | 0.25/1 | 42.0 | EO/PO (block) | 0.4 | 122 | 7.01 | 42 |
| 40 | ethylene glycol | palm oil | 0.25/1 | 42.0 | EO/PO (block) | 4.2 | 122 | 7.00 | 53 |
| 41 | propylene glycol | palm oil | 0.25/1 | 33.1 | EO/PO (random) | 0.3 | 80 | 6.86 | 32 |
| 42 | propylene glycol | palm oil | 0.25/1 | 33.1 | EO/PO (random) | 4.1 | 80 | 6.82 | 51 |

*1EO: ethylene oxide. PO: propylene oxide.

EXAMPLE 7

Recovered waste magazines were cut into pieces (2×5 cm) and a given amount thereof was fed into a low concentration pulper. Then water, 0.5% (based on the starting waste papers) of caustic soda, 1.0% (based on the starting waste papers) of sodium silicate No. 3, 0.8% (based on the starting waste papers) of 30% hydrogen peroxide, 0.05% (based on the starting waste papers) of a chelating agent (DTPA) and 0.06% (based on the starting waste papers) of each of the deinking agents listed in Table 7 were added thereto to conduct disintegration at a pulp concentration of 4% at 40° C. for 15 minutes. Next, it was diluted with water to a pulp concentration of 1.0% and subjected to flotation at 30° C. for 10 minutes. After the completion of the flotation, the obtained pulp slurry was concentrated until the pulp concentration reached 6% and then diluted with water so as to give a concentration of 1%. Then it was treated with a TAPPI sheet machine to thereby give a pulp sheet.

The b value of the obtained pulp sheet was measured with a color difference meter and the percentage defoaming of the flotation reject was determined.

Table 7 shows the ethylene oxide addition mol number and deinking performance of each deinking agent.

EXAMPLE 8

A recovered waste newspaper/magazine mixture (50/50 by weight) was cut into pieces (2×5 cm) and a given amount thereof was fed into a bench disintegrator. Then water, 0.8% (based on the starting waste papers) of caustic soda, 2.0% (based on the starting waste papers) of sodium silicate No. 3, 1.5% (based on the starting waste papers) of 30% hydrogen peroxide and 0.5% (based on the starting waste papers) of each of the deinking agents listed in Table 8 were added thereto to conduct disintegration at a pulp concentration of 5% at 50° C. for 15 minutes and then aging at 50° C. for 2 hours. Next, it was diluted with water to a pulp concentration of 1.0% and subjected to flotation at 30° C. for 10) minutes. After the completion of the flotation, the obtained pulp slurry was concentrated until the pulp concentration reached 6% and then diluted with water so as to give a concentration of 1%. Then it was treated with a TAPPI sheet machine to thereby give a pulp sheet.

The b value of the obtained pulp sheet was measured with a color difference meter and the percentage defoaming of the flotation reject was determined.

Table 8 shows the order of the addition of the alkylene oxides to the glycerol ester and deinking performance of each deinking agent.

TABLE 7

Ethylene oxide addition mol number and deinking performance

| No. | Dihydric alcohol | Natural fat | Dihydric alcohol/ glycerol (by mole) | OHV | Alkylene oxide compound*1 | EO/PO (by mole) | EO mol no. | Qualities of deinking pulp b value (%) | percentage defoaming of flotation reject (%) |
|---|---|---|---|---|---|---|---|---|---|
| Invention product | | | | | | | | | |
| 43 | hexanediol | beef tallow | 0.4/1 | 50.0 | EO/PO (random) | 2.0 | 40 | 7.26 | 435 |
| 44 | ethylene glycol | bone oil | 0.3/1 | 38.4 | EO/PO (block) | 1.9 | 160 | 7.32 | 420 |
| 45 | hexanediol | beef tallow | 0.4/1 | 50.0 | EO/PO (random) | 2.0 | 6 | 6.63 | 470 |
| 46 | hexanediol | beef tallow | 0.4/1 | 50.0 | EO/PO (random) | 2.0 | 420 | 6.50 | 495 |
| 47 | ethylene glycol | bone oil | 0.3/1 | 38.4 | EO/PO (block) | 1.9 | 8 | 6.81 | 410 |
| 48 | ethylene glycol | bone oil | 0.3/1 | 38.4 | EO/PO (block) | 1.9 | 425 | 6.82 | 490 |

*1EO: ethylene oxide. PO: propylene oxide.

TABLE 8

Order of the addition of alkylene oxides and deinking performance

| No. | Dihydric alcohol | Natural fat | Dihydric alcohol/ glycerol (by mole) | OHV | Alkylene oxide compound[*1] | EO/PO (by mole) | EO mol no. | Qualities of deinking pulp b value (%) | percentage defoaming of flotation reject (%) |
|---|---|---|---|---|---|---|---|---|---|
| Invention product | | | | | | | | | |
| 49 | ethylene glycol | palm oil | 0.18/1 | 24.0 | EO/PO (random) | 1.9 | 116 | 9.71 | 90 |
| 50 | ethylene glycol | beef tallow | 0.25/1 | 32.1 | EO/PO (random) | 2.0 | 88 | 9.70 | 90 |
| 51 | ethylene glycol | palm oil | 0.18/1 | 24.0 | EO/PO (block) | 1.9 | 116 | 9.60 | 91 |
| 52 | ethylene glycol | beef tallow | 0.25/1 | 32.1 | EO/PO (block) | 2.0 | 88 | 9.63 | 82 |

[*1]EO: ethylene oxide. PO: propylene oxide.

We claim:

1. A deinking agent comprising, as the active ingredient, an ester mixture, said ester mixture being formed by reacting (a) a mixture of ethyleneoxide and propylene oxide with (b) a product selected from the group consisting of:
   1) a reaction product of a natural fat and a monohydric alcohol; and
   2) a reaction product of a natural fat and glycerol, which is further reacted with a monohydric alcohol;

wherein the molar ratio of said monohydric alcohol to the glycerol moiety, in the fat/glycerol reaction product (2) or to the glyceryl ester-constituting said natural fat, is from 0.02/1–1/1;

wherein the hydroxy value of the reaction product (1) or (2) is from 3–50;

wherein the molar ratio of ethylene oxide to propylene oxide is 0.5–4.0; and wherein the addition mol number of ethylene oxide is 5–200.

2. A deinking agent according to claim 1, wherein the monohydric alcohol is selected from the group consisting of $C_1$ to $C_{24}$ 1-alkanols and 2-alkanols, unsaturated alcohols, cyclic alcohols, and mixtures thereof.

3. A deinking agent according to claim 1, wherein ethylene oxide and propylene oxide are added at random.

* * * * *